United States Patent
Cha et al.

(10) Patent No.: US 9,178,580 B2
(45) Date of Patent: *Nov. 3, 2015

(54) METHOD AND APPARATUS FOR ANTENNA MAPPING SELECTION IN MIMO-OFDM WIRELESS NETWORKS

(71) Applicant: InterDigital Technology Corporation, Wilmington, DE (US)

(72) Inventors: Inhyok Cha, Seoul (KR); Eldad M. Zeira, Huntington, NY (US); Keith Richard Baldwin, Melbourne Beach, FL (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/936,601

(22) Filed: Jul. 8, 2013

(65) Prior Publication Data
US 2013/0294537 A1 Nov. 7, 2013

Related U.S. Application Data

(63) Continuation of application No. 11/400,400, filed on Apr. 6, 2006, now Pat. No. 8,483,200.

(60) Provisional application No. 60/669,048, filed on Apr. 7, 2005.

(51) Int. Cl.
*H04B 7/04* (2006.01)
*H04B 7/06* (2006.01)
*H04B 7/08* (2006.01)

(52) U.S. Cl.
CPC ............ *H04B 7/0413* (2013.01); *H04B 7/0695* (2013.01); *H04B 7/088* (2013.01)

(58) Field of Classification Search
CPC .... H01Q 3/2605; H04B 7/061; H04B 7/0626; H04B 7/0697; H04B 17/0002; H04B 17/0005; H04B 7/0421; H04B 7/0891; H04L 1/06; H04L 25/03343; H04L 25/0242; H04W 16/28; H04W 52/08; H04W 52/262

See application file for complete search history.

(56) References Cited

U.S. PATENT DOCUMENTS 6,049,549 A   4/2000  Ganz et al.
6,351,499 B1  2/2002  Paulraj
(Continued)

FOREIGN PATENT DOCUMENTS

CN   1278988 A   1/2001
CN   1435015 A   8/2003
(Continued)

OTHER PUBLICATIONS

Berenguer, I., "Adaptive MIMO Antenna Selection Signals, Systems and Computers, 2003," Conference Record of the Thirty-Seventh Asilomar Conference, IEEE, vol. 1, pp. 21-16 (Nov. 2003).
(Continued)

*Primary Examiner* — Kashif Siddiqui
(74) *Attorney, Agent, or Firm* — Condo Roccia Koptiw LLP (57) ABSTRACT

A method and apparatus for selecting an antenna mapping in multiple-in/multiple-out (MIMO) enabled wireless communication networks. A candidate set of currently available antenna mappings is determined based upon measured long term channel conditions. An antenna mapping is selected from the candidate set, and the mapping is calibrated with a selected antenna mapping of a receiving wireless transmit/receive unit (WTRU). When the selected mappings are calibrated, packet data transmission begins. In an alternative embodiment, a calibration training frame (CTF) is used to calibrate multiple antenna mappings simultaneously or sequentially. Also disclosed are physical layer and medium access control layer frame formats for implementing antenna mapping selection according to the invention.

8 Claims, 5 Drawing Sheets

(56) References Cited

U.S. PATENT DOCUMENTS

| | | | |
|---|---|---|---|
| 6,434,375 | B1 | 8/2002 | Chulajata et al. |
| 6,768,715 | B2 | 7/2004 | Hsu et al. |
| 6,774,864 | B2 | 8/2004 | Evans et al. |
| 6,795,407 | B2 | 9/2004 | Chesson |
| 6,804,532 | B1 | 10/2004 | Moon et al. |
| 7,167,690 | B2 | 1/2007 | Baker et al. |
| 7,392,015 | B1 | 6/2008 | Farlow et al. |
| 2002/0071406 | A1 | 6/2002 | Bursztejn et al. |
| 2002/0085643 | A1 | 7/2002 | Kitchener et al. |
| 2002/0102950 | A1 | 8/2002 | Gore et al. |
| 2003/0002450 | A1 | 1/2003 | Jalali et al. |
| 2003/0128658 | A1 | 7/2003 | Walton et al. |
| 2003/0162511 | A1 | 8/2003 | Kim et al. |
| 2003/0220103 | A1 | 11/2003 | Kim et al. |
| 2004/0085939 | A1 | 5/2004 | Wallace et al. |
| 2004/0127260 | A1 | 7/2004 | Boros et al. |
| 2004/0156439 | A1 | 8/2004 | Creusot et al. |
| 2004/0171408 | A1 | 9/2004 | Maruta et al. |
| 2004/0180701 | A1 | 9/2004 | Livet et al. |
| 2005/0026585 | A1 | 2/2005 | Jimi et al. |
| 2005/0101352 | A1* | 5/2005 | Logothetis et al. ........ 455/562.1 |
| 2006/0035674 | A1 | 2/2006 | Karaoguz et al. |
| 2006/0068718 | A1* | 3/2006 | Li et al. ........................... 455/69 |
| 2006/0077935 | A1 | 4/2006 | Hamalainen et al. |
| 2006/0146725 | A1 | 7/2006 | Li et al. |
| 2008/0056402 | A1 | 3/2008 | Jang et al. |

FOREIGN PATENT DOCUMENTS

| | | |
|---|---|---|
| CN | 1551530 A | 12/2004 |
| EP | 1 063 789 | 12/2000 |
| EP | 1392029 A1 | 2/2004 |
| GB | 2 298 338 | 8/1996 |
| JP | 07170227 A | 7/1995 |
| JP | 2001-168789 | 6/2001 |
| JP | 2004-007242 | 1/2004 |
| JP | 2008-536406 | 9/2008 |
| WO | WO 99-23846 A1 | 5/1999 |
| WO | WO 01-45300 A1 | 6/2001 |
| WO | 03/034614 | 4/2003 |
| WO | 03/073645 | 9/2003 |
| WO | WO 2004-038952 A2 | 6/2004 |
| WO | WO 2005-013528 A1 | 2/2005 |
| WO | WO 2006-110737 A2 | 10/2006 |

OTHER PUBLICATIONS

Blum, R.S., "On Optimum MIMO with Antenna Selection Communications Letters," IEEE Communications Letters, vol. 6, No. 8, pp. 262-264 (Aug. 2002).

IEEE P802.11n/D1.0, Draft Amendment to STANDARD [FOR] Information Technology—Telecommunications and information exchange systems—Local and Metropolitan networks—Specific requirements—Part 11: Wireless LAN Medium Access Control (MAC) and Physical Layer (PHY) specifications: Enhancements for Higher Throughput (Mar. 2006).

Molisch et al., "MIMO Systems with Antenna Selection—An Overview," Mitsubishi Electric Research Laboratories, pp. 1-17 (Mar. 2004).

Sanayei, S., Antenna Selection in MIMO Systems Communications, IEEE Communications Magazine, vol. 42, Issue 10, pp. 68-73 (Oct. 2004).

* cited by examiner

METHOD AND APPARATUS FOR ANTENNA MAPPING SELECTION IN MIMO-OFDM WIRELESS NETWORKS

CROSS REFERENCE TO RELATED APPLICATIONS

This application is a continuation of U.S. patent application Ser. No. 11/400,400, filed Apr. 6, 2006, which claims the benefit of U.S. Provisional Patent Application Ser. No. 60/669,048, filed Apr. 7, 2005, which are incorporated by reference as if fully set forth.

FIELD OF INVENTION

The present invention generally relates to wireless communication systems using multiple in-multiple out (MIMO) technology. More particularly, the present invention relates to selecting the optimum transmission settings of a MIMO capable multiple antenna array.

BACKGROUND

Wireless communication devices having multiple antennas arranged in a diversity configuration offer a variety of transmission and reception benefits compared to devices with just a single antenna. The basis of diversity is that, at any given time, the antenna with the best reception is selected for reception or transmission. Although a device utilizing antenna diversity may have multiple physical antennas, there is only a single set of electronic circuitry to process the signal, also called a radio frequency (RF) chain.

Multiple in-multiple out (MIMO) wireless technology improves upon antenna diversity by utilizing multiple RF chains. Each RF chain is capable of simultaneous reception or transmission. This allows a MIMO device to achieve higher throughput and to resolve negative effects of multipath interference. In a transmitting device, each RF chain is responsible for transmitting a spatial stream. A single frame can be disassembled and multiplexed across multiple spatial streams, which are then reassembled at a receiver.

MIMO is one of the most promising techniques in wireless communications. Unlike traditional smart antenna techniques that aim to mitigate detrimental multipath fading and enhance robustness of a single data stream, MIMO takes advantage of multipath fading to transmit and receive multiple data streams simultaneously. Theoretically, the capacity in a MIMO system increases linearly with the number of transmit and receive antennas. MIMO is being considered by numerous wireless data communication standards, such as IEEE 802.11n and 3GPP wideband code division multiple access (WCDMA).

In implementing MIMO, a WTRU may operate in either a spatial multiplexing mode or a spatial diversity mode. In the spatial multiplexing mode, a WTRU transmits multiple independent data streams to maximize data throughput. While in the spatial diversity mode, a WTRU may transmit a single data stream via multiple antennas. Depending on the operation mode, a WTRU is configured to select an appropriate quality metric or a combination of quality metrics to utilize in the selection of a desired beam combination. Typically, an m×N channel matrix H is obtained of the form:

$$H = \begin{bmatrix} h_{Aa} & \cdots & h_{Na} \\ \cdots & & \cdots \\ h_{Am} & \cdots & h_{Nm} \end{bmatrix},$$

where the subscripts of the elements h represent contributions attributable to each antenna mapping between transmitting WTRU A's antennas a ... m and a receiving WTRU N's antennas a ... m.

A WTRU may obtain a calibration matrix (K) in a similar manner. Calibration in the context of wireless LANs involves calculating a set of complex-valued correction coefficients that, when multiplied at the transmitting WTRU's baseband streams on a per-antenna and per-sub-carrier basis, would equalize the response difference between transmit and receive processing paths (up to an unknown constant across antennas).

Figure 1:
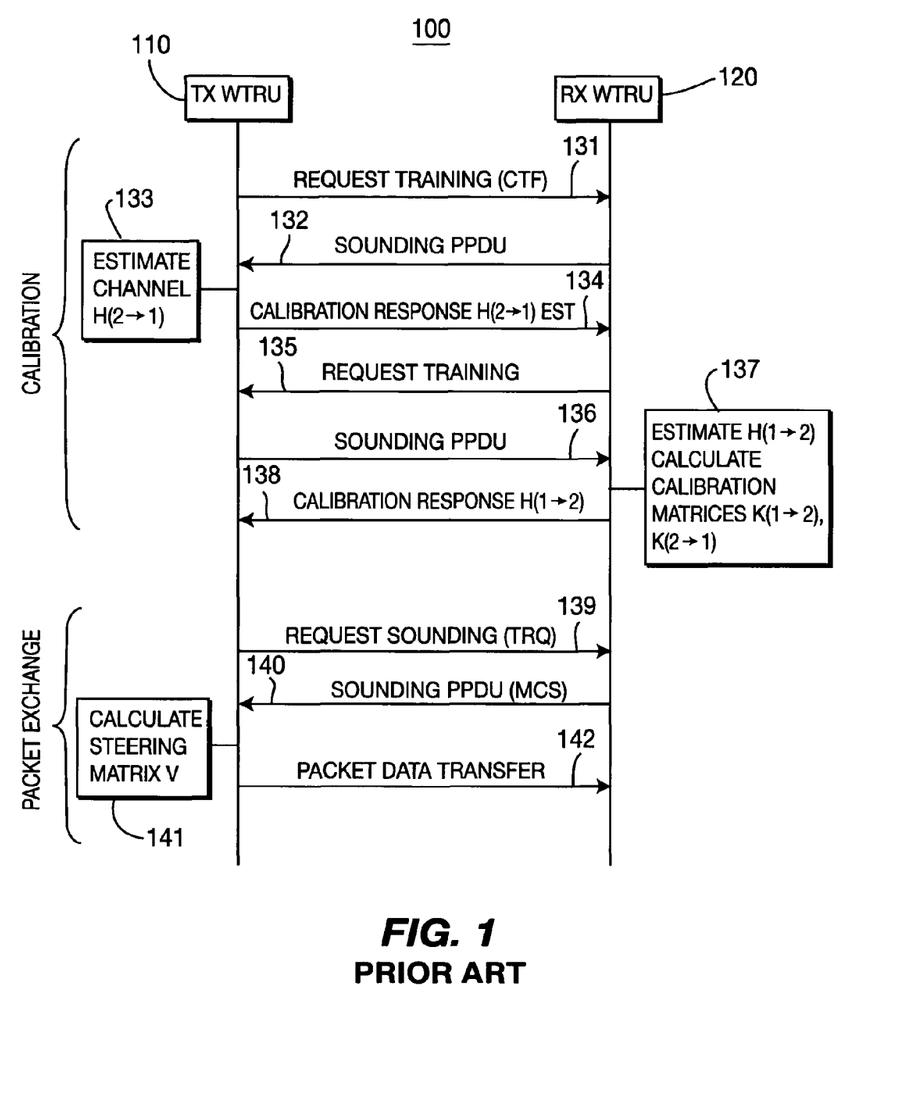
FIG. 1 is a signal diagram of a prior art channel calibration and packet data transfer.

Referring to FIG. 1, a signal diagram 100 of prior art channel calibration is shown. A transmitting WTRU (Tx WTRU) 110 first needs to calibrate the existing channel between receiving WTRU (Rx WTRU) 120. Tx WTRU 110 transmits a calibration training frame (CTF) 131 to Rx WTRU 120. Rx WTRU 120 responds by transmitting a sounding physical packet data unit (PPDU) 132. Tx WTRU1 110 calculates a channel estimation H 133 for the channel, referred to as H(2→1). Tx WTRU 110 transmits a calibration response 134 which includes the channel estimation H(2→1). Rx WTRU 120 then performs channel estimation by transmitting a CTF 135 to Tx WTRU 110. In response, Tx WTRU 110 transmits a sounding PPDU 136. Rx WTRU 120 calculates a channel estimation H(1→2), and calculates a calibration matrices K(1→2) and K(2→1) for the channel 137. Rx WTRU 120 then transmits a calibration response 138 including calibration matrix K(1→2) to Tx WTRU 110. It should be noted that the calibration matrix K(1→2) is then applied at Tx WTRU1 110 as a baseband gain or phase correction factor for transmissions to Rx WTRU 120. The calibration matrix K(2→1) is applied at Rx WTRU 120, again as a baseband gain/phase correction factor, in Rx WTRU's 120 transmission of signals to Tx WTRU 110. The channel is now calibrated and ready for packet exchange.

To initiate data packet exchange, Tx TWRU 110 transmits a request 139 to the Rx WTRU 120, which responds by sending modulation and coding scheme (MCS) PPDU 140. Tx WTRU 110 uses the calibration matrix K(1→2) to calculate a steering matrix V, and packet data transfer 142 begins.

The prior art does not consider the utilization of smart antenna technology. Smart antennas, and beamforming in particular, is a signal processing technique used with arrays of transmitters or receivers that controls the directionality of, or sensitivity to, a radiation pattern. When receiving a signal, beamforming can increase the gain in the direction of wanted signals and decrease the gain in the direction of interference and noise. When transmitting a signal, beamforming can increase the gain in the direction the signal is to be sent. When beamforming capable antennas are combined with MIMO, the number of available antenna mappings dramatically increases.

When beamforming antennas are included in a WTRU, the number of available antenna mappings may become very large. In order to optimize the communication link between two WTRUs, it is necessary to select the appropriate antenna mapping at both the transmitter and the receiver.

Therefore, a method and apparatus for efficiently utilizing the variety of available antenna mappings in a MIMO capable wireless device having multiple beamforming antennas is desired.

SUMMARY

The present invention is a method and apparatus for selecting an antenna mapping in multiple-in/multiple-out (MIMO) enabled wireless communication networks. A candidate set of currently available antenna mappings is determined based upon measured long term channel conditions. An antenna mapping is selected from the candidate set, and the mapping is calibrated with a selected antenna mapping of a receiving wireless transmit/receive unit (WTRU). When the selected mappings are calibrated, packet data transmission begins. In an alternative embodiment, a calibration training frame (CTF) is used to calibrate multiple antenna mappings simultaneously or sequentially. Also disclosed are physical layer and medium access control layer frame formats for implementing antenna mapping selection according to the invention.

BRIEF DESCRIPTION OF THE DRAWINGS

A more detailed understanding of the invention may be had from the following description, given by way of example and to be understood in conjunction with the accompanying drawings, wherein.

DETAILED DESCRIPTION OF THE PREFERRED EMBODIMENTS

Although the features and elements of the present invention are described in the preferred embodiments in particular combinations, each feature or element can be used alone (without the other features and elements of the preferred embodiments) or in various combinations with or without other features and elements of the present invention.

Hereafter, a wireless transmit/receive unit (WTRU) includes but is not limited to a user equipment, mobile station, fixed or mobile subscriber unit, pager, or any other type of device capable of operating in a wireless environment. When referred to hereafter, an access point (AP) includes but is not limited to a Node-B, site controller, base station or any other type of interfacing device in a wireless communication environment. As used herein, the term "antenna mapping" means a specific combination of an antenna, or an antenna beam in the case of a beamforming antenna, with a particular RF processing chain.

Figure 2:
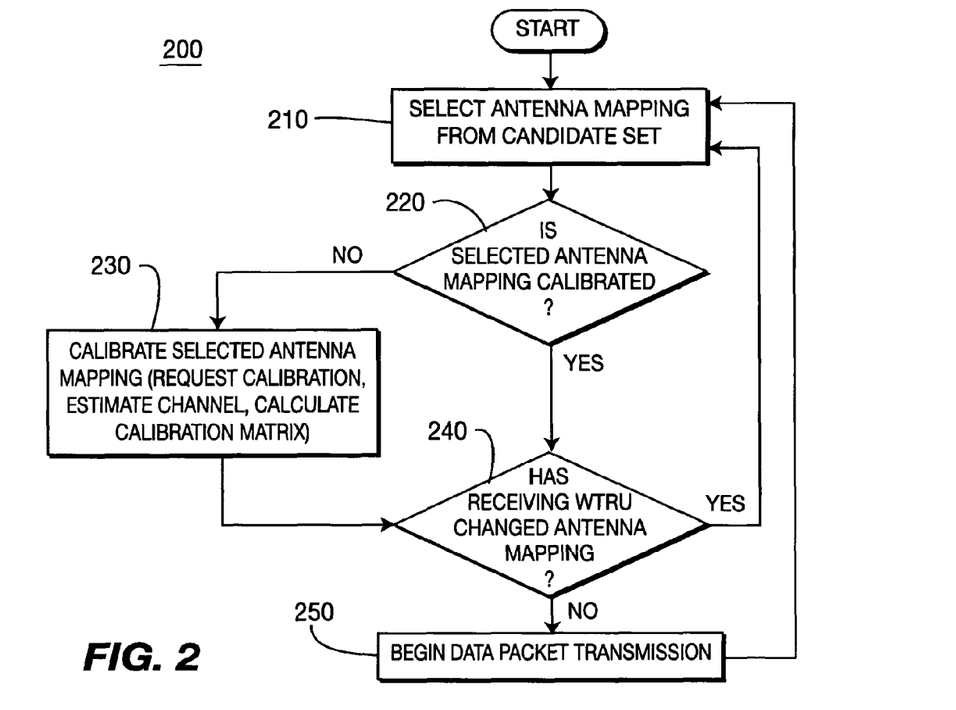
FIG. 2 is a flow chart of a method for selecting antenna mappings in accordance with a preferred embodiment of the present invention.

Referring to FIG. 2, a method 200 for antenna mapping selection in accordance with the invention is shown. A WTRU selects an antenna mapping from a candidate set of currently available antenna mappings, (step 210). The WTRU determines if the selected antenna mapping is calibrated, (step 220). If it is determined that the selected antenna mapping is not calibrated, the WTRU calibrates the selected antenna mapping, (step 230). It should be noted that an antenna mapping calibration that has previously been calibrated may become stale. Calibration of the selected antenna mapping is discussed in greater detail below. Next, the WTRU determines whether the receiver WTRU has changed its antenna mapping, (step 240). If the receiving WTRU has changed its antenna mapping, the method returns to step 210 to select a new transmitter antenna mapping, if desired. If it is determined that the receiver WTRU has not changed its antenna mapping, the transmitting WTRU begins packet data transmission using the selected and calibrated antenna mapping, (step 250). The method returns to step 210 so that the transmitting WTRU may change its antenna mapping.

Figure 3:
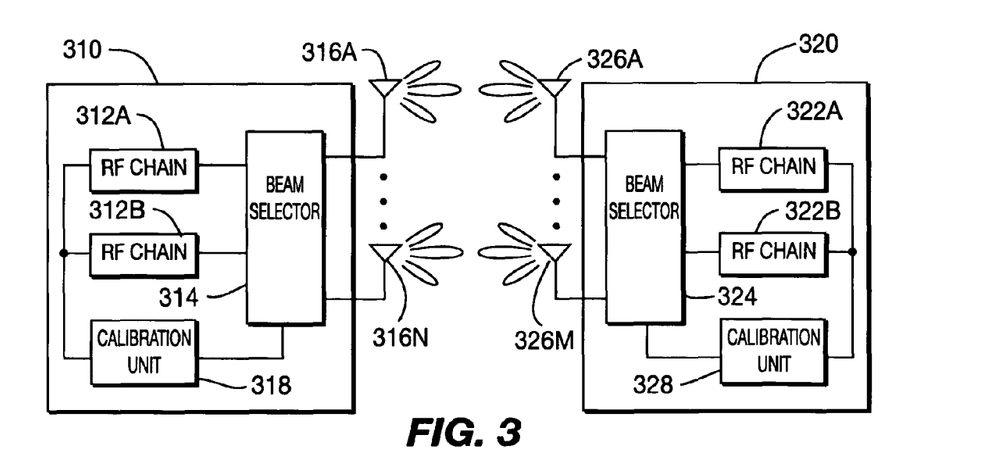
FIG. 3 is a block diagram of a system including an AP and a WTRU in accordance with the present invention.

Referring to FIG. 3, a wireless communication system 300 including a first WTRU 310 and a second WTRU 320 for performing antenna mapping selection in accordance with the present invention is shown. Hereinafter, the present invention will be explained with reference to downlink transmission from a transmitting WTRU 310 to a receiving WTRU 320. However, the present invention is equally applicable to both uplink and downlink transmissions where either WTRU 310 or WTRU 320 is a base station as well as for configurations where WTRU 310 is in direct communication with WTRU 320 in an ad hoc or mesh network.

The WTRU 310 includes two RF chains 312A, 312B, a beam selector 314, a plurality of antennas 316A-316n, where n is any integer greater than 1, and a calibration unit 318. In this exemplary embodiment antennas 316A-316n are capable of generating multiple beams. The WTRU 320 includes two RF chains 322A, 322B, a beam selector 324, and a plurality of antennas 326A-326m, where m is any integer greater than 1. Again, in this exemplary embodiment at least one of the antennas 326A-326m is capable of generating multiple beams. Referring specifically to WTRU 320, a beam combination is selected by the beam selector 324 for MIMO transmission and reception in accordance with the presently inventive method 200 described above with reference to FIG. 2. The selected antenna mapping is utilized for transmission and reception in accordance with a control signal output from the beam selector 324. The beam selector 324 selects a particular beam combination based on quality metrics generated and stored in the calibration unit 328 as explained in detail hereinafter. The WTRU components of the present invention may be incorporated into an integrated circuit (IC) or be configured in a circuit comprising a multitude of interconnecting components. It should be understood that while this exemplary embodiment includes two RF chains, this is purely for convenience, and any number of RF chains may be utilized.

For simplicity, FIG. 3 illustrates both transmitting WTRU 310 and receiving WTRU 320 equipped with beamforming antennas, each of which generates three (3) beams. However, the configuration shown in FIG. 3 is provided as an example, not as a limitation. Any combination of antenna types having any number of beams, or antennas that are not of the beamforming or beam-switching type, may be utilized.

The antennas may be switched parasitic antennas (SPAs), phased array antennas, or any type of directional beam forming antennas. A SPA is compact in size, which makes it suitable for WLAN devices. If a SPA is used, a single active antenna element in conjunction with one or more passive antenna elements may be used. By adjusting impedances of the passive antenna elements, the antenna beam pattern may be adjusted and the impedance adjustment may be performed by controlling a set of switches connected to the antenna elements. Alternatively, the antennas may be composites including multiple antennas which may all be omni-directional antennas. For example, three omni-directional antennas having a selected physical spacing may be used for each of the antennas 326A-326m and the omni-directional antennas may be switched on and off in accordance with a control signal from the beam selector 324 to define different beam combinations.

To illustrate, reference is made to FIG. 3. Transmitter WTRU 310 (also referred to herein as Tx WTRU) includes two RF chains, 312A, and 312B. The beam selector 314 couples several omni-directional antennas 316A-316n to the RF chains 312A, 312B. The number of possible antenna mappings for transmitter WTRU 310 is therefore n times the number of RF chains. Receiver WTRU 320 (also referred to herein as Rx WTRU) also includes two RF chains, 322A and 322B. A beam selector 124 couples several beamforming antennas 326A-326m to the RF chains 322A and 322B. As mentioned above, in this simple exemplary embodiment, each beamforming antenna 326A-326m is capable of forming three directional beams. Therefore, receiver WTRU 120 has a total of m times the number of beams times the number of RF chains antenna mappings. The set of all possible antenna mappings that can be employed at any transmitting station is termed the 'superset', and the size of the superset is denoted by $N_{superset}$. $N_{superset}$ may be very large, and it may not be practical to utilize all available antenna mappings at any given time.

A candidate set is a subset of the superset and is a collection of antenna mappings available for selection at any given time. Preferably, the size of the candidate set is limited to between 8 and 32 antenna mappings. A candidate set is not static, but rather it is dynamic and may change over time to reflect changing channel conditions. For example, a transmitting station may monitor the channel conditions of all of the antenna mappings in the current candidate set, either continuously or periodically, and if the measured channel conditions fail to meet a predetermined threshold for a predetermined time, the transmitting station may modify the candidate set. This may be accomplished by discarding several antenna mappings from the current candidate set, introducing several new antenna mappings, and/or retaining several antenna mappings in the candidate set. In high-speed mobility applications, the candidate set may be reduced or selection of an antenna mapping may be stopped altogether.

In a preferred embodiment of the present invention, WTRU 310 may select any antenna mapping from the candidate set. The selection of an antenna mapping is based on long term criterion. No per packet channel tracking is performed, and accordingly, the selection of an antenna mapping does not track fast changes, or micro-structures, of a channel. It should be noted that any changes of the antenna mappings in the candidate set occur outside of any active transmission or reception of data packets.

Still referring to FIG. 3, during operation, the calibration unit 318 of receiving WTRU 310 measures a selected quality metric on each of the antenna beams or beam combinations of the current candidate set and outputs a quality metric measurement data to the beam selector 314. The beam selector 314 chooses a desired antenna mapping for data communications with the receiving WTRU 320 based on the quality metric measurement. The calibration unit 318 further generates sounding requests for periodic (or aperiodic) calibration as needed, calibration training frames, and sounding PPDUs in response to requests for calibration. The calibration unit 318 includes a processor for calculating a channel estimation matrix and a calibration matrix based on received sounding packets, and a memory for storing channel estimation matrices and calibration matrices. The calibration unit 318 preferably performs signaling and messaging in compliance with IEEE standards, such as the IEEE 802.11 family of standards, and most preferably the IEEE 802.11n standard.

Various quality metrics may be used for determining a desired antenna mapping. Physical (PHY) layer, medium access control (MAC) layer or upper layer metrics are suitable. Preferred quality metrics include, but are not limited to, channel estimations, a signal-to-noise and interference ratio (SNIR), a received signal strength indicator (RSSI), a short-term data throughput, a packet error rate, a data rate, a WTRU operation mode, the magnitude of the maximum eigen-value of the received channel estimation matrix, or the like.

Figures 4, 4A:
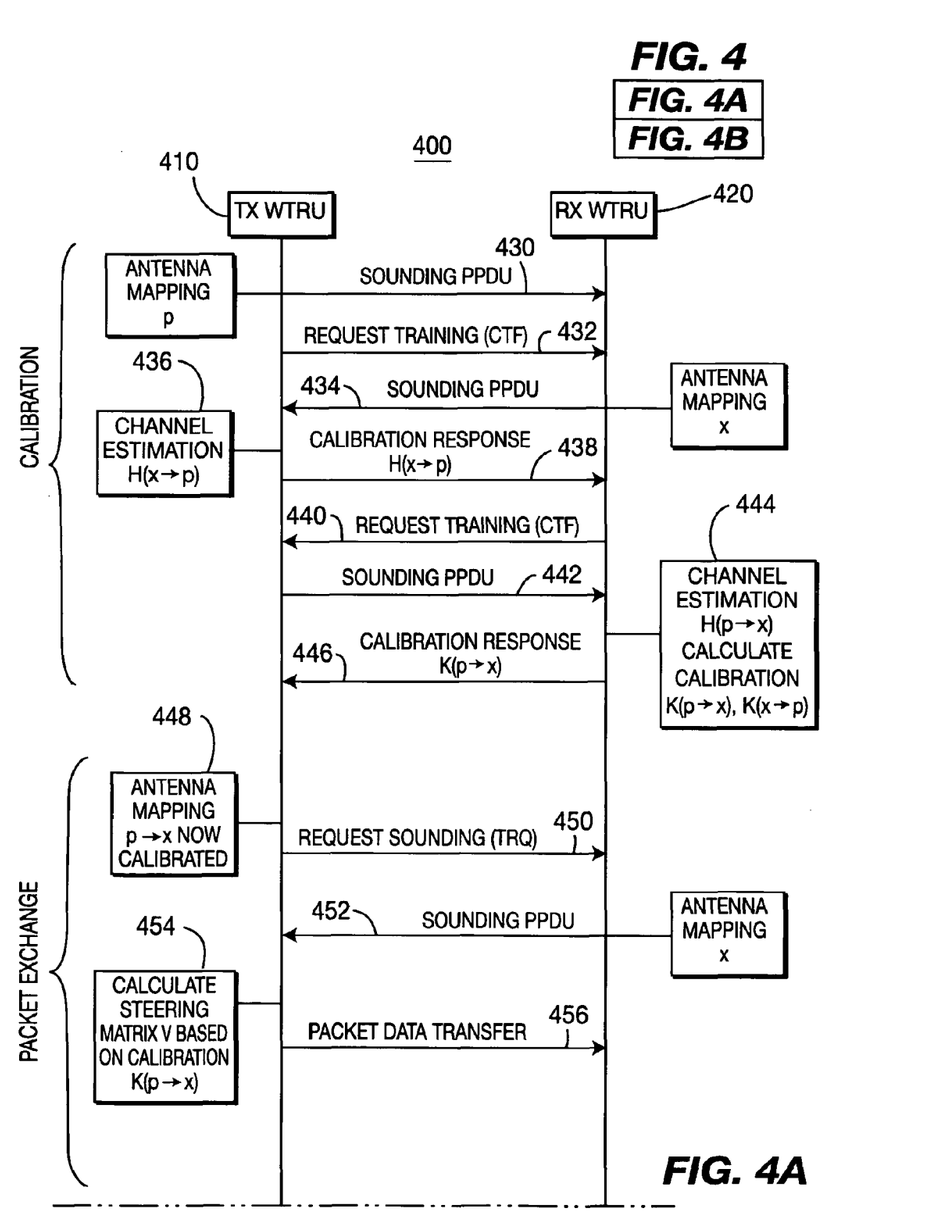
FIGS. 4A and 4B are a signal timing diagram of channel calibration and packet data transfer where antenna mapping selection in accordance with the present invention is utilized.
Figure 4B:
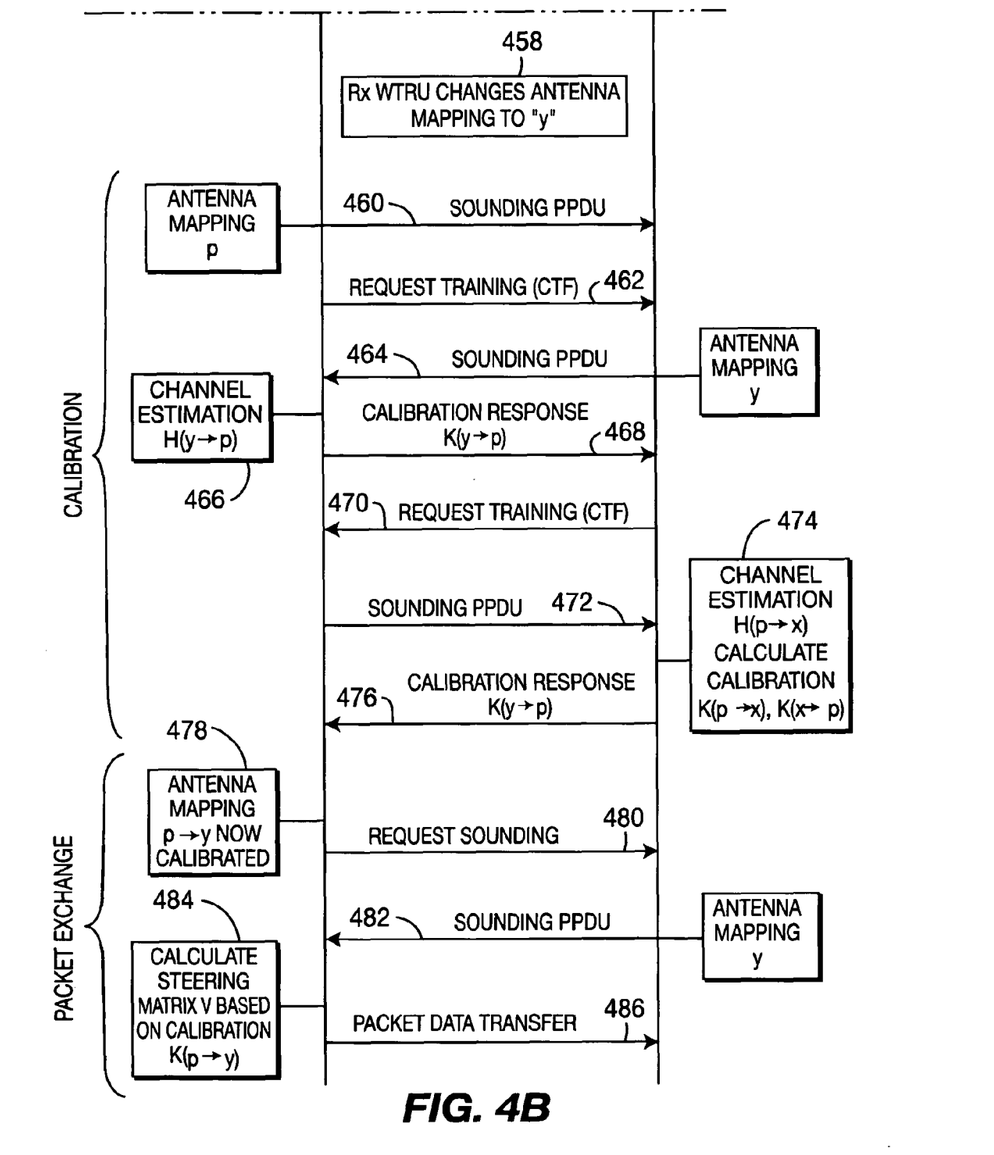

To illustrate the method 200 for antenna mapping selection described with reference to FIG. 2, a signal timing diagram 400 of antenna mapping selection is shown in FIGS. 4A and 4B. A first Tx WTRU 410 transmits a sounding PPDU 430 using antenna mapping p to Rx WTRU 420. Tx WTRU 410 then transmits a calibration training frame 432 requesting calibration. Rx WTRU 420 is currently using antenna mapping x, and replies to the CTF 432 with a sounding PPDU 434 sent using antenna mapping x. Tx WTRU 410 performs channel estimation 436 for the antenna mappings in use at both the Tx WTRU 410 and the Rx WTRU 420, namely antenna mapping p and antenna mapping x, respectively. A channel estimation matrix is calculated, $H(x \rightarrow p)$. Tx WTRU 410 transmits a calibration response 438 including the calculated channel estimation. Next, the Rx WTRU 420 transmits its own CTF 440 to the Tx WTRU 410. Tx WTRU 410 replies with a sounding PPDU 442. Rx WTRU 420 uses the sounding PPDU 442 to calculate a channel estimation $H(p \rightarrow x)$ and a calibration matrix for the currently selected antenna mappings, $K(p \rightarrow x)$, $K(x \rightarrow p)$ 444. Rx WTRU 420 then transmits a calibration response 446 to Tx WTRU 410 which includes the channel calibration matrix of interest to Tx WTRU 410, namely $K(p \rightarrow x)$. Antenna mapping $p \rightarrow x$ is now calibrated, 448.

The WTRUs are then free to begin a data packet exchange using the calibrated channel. Tx WTRU 410 transmits a transmit request (TRQ) 450 to Rx WTRU 420. Rx WTRU 420 responds with a sounding PPDU 452 transmitted using antenna mapping x. Tx WTRU 410 then calculates a steering matrix V based on the calibration matrix $K(p \rightarrow x)$ 454. Packet data transfer 456 ensues.

For a variety of reasons, such as a change in the channel conditions, as measured using a channel quality metric, or mobility of either of the WTRUs, for example, Rx WTRU 420 changes antenna mapping from x to y 458. It is then determined whether antenna mapping $p \rightarrow y$ is calibrated. In this exemplary embodiment, the antenna mapping $p \rightarrow y$ is not calibrated, and therefore calibration is required. Tx WTRU 410 transmits a sounding PPDU 460 on antenna mapping p, and then a CTF 462. Rx WTRU 420 replies with a sounding PPDU 464 using antenna mapping y. Channel estimation $H(y \rightarrow p)$ 466 occurs at the Tx WTRU 410, and a calibration response 468 is transmitted including the channel estimation. The Rx WTRU 420 then requests calibration 470, and the Tx WTRU complies with a sounding PPDU 472. Rx WTRU 420 calculates channel estimation $H(p \rightarrow y)$, and calibration matrices K(p→y) and K(y→p), 474. A calibration response 476 is then transmitted to the Tx WTRU 410 including the calibration matrix of interest to the Tx WTRU 410. The antenna mapping p→y is now calibrated and ready for data packet exchange, 478.

Data packet exchange then beings with the Tx WTRU 410 requesting sounding 480, and the Rx WTRU 420 responding with a sounding PPDU 482 transmitted using antenna mapping y. A steering matrix V is then calculated based on the calibration K(p→y), and packet data transfer 486 ensues.

In an alternative embodiment, the calibration of multiple antenna mappings occurs in sequence prior to data packet transfer. Similar to the calibration signaling 430 through 448 shown in FIG. 4, a receiving WTRU may respond to CTF using multiple antenna mappings selected from its current candidate set. The resulting calibration matrices may be stored for future reference. For example, a transmitting WTRU may select antenna mapping f, and transmit a CTF to the receiving WTRU requesting calibration. The receiving WTRU may respond sequentially with a sounding PPDU using each antenna mapping q, r, and s, selected from its currently available candidate set. Transmitting WTRU calibrates the channel corresponding to antenna mappings f→q, f→r, and f→s, and stores the calibration matrices in memory for future reference prior to packet data transmission. If a receiving WTRU changes its antenna mapping to, for example, antenna mapping r, the transmitting WTRU may retrieve the appropriate calibration matrix from memory and begin data packet transmission without performing calibration again.

Alternatively, calibration of multiple antenna mappings may occur in parallel (i.e. simultaneously) thereby reducing signaling. In this embodiment, a single sounding PPDU is sent by a transmitting WTRU using a selected antenna mapping, for example mapping b. A receiving WTRU, having currently available antenna mappings t, u, and v, responds to the single CTF using each of the available antenna mappings t, u, and v, and a calibration matrix is calculated for each antenna mapping b→t, b→u, and b→v. In this manner, the required calibration signaling is reduced thereby decreasing calibration lag and increasing throughput.

In an alternative embodiment, where the wireless communication system is compliant with the IEEE 802.x standards, the sounding PPDU includes a modulation control sequence (MCS) bit field. This MCS bit field is a MAC information element (IE) that indicates the current receiving WTRU antenna mapping candidate set size and currently selected antenna mapping at the receiving WTRU. Preferably the MCS bit field has a length of 5 bits. Optionally, the MCS bit field includes a one bit 'run length indicator' that permits a transmitting WTRU to request a receiving WTRU to change its current candidate set of antenna mappings.

A transmitting WTRU may request a receiving WTRU to change its antenna mapping candidate set if the transmitting WTRU is unable to find an antenna mapping at the receiver that satisfies its quality requirements, for example. In this circumstance, if the receiving WTRU is able to change its candidate set, it can indicate that it will immediately change its antenna mapping candidate set using a new MAC management frame.

When a transmitting WTRU wishes to change its candidate set for any of the various possible reasons (e.g., if the transmitting WTRU is unable to find an antenna mapping of its own from the current candidate set that satisfies its quality requirements), the transmitting WTRU can indicate a candidate set change to the receiving WTRU by sending a MAC management frame. The transmitting WTRU may then immediately change its antenna mapping candidate set and select a suitable antenna mapping from among the mappings in the new candidate set for transmission.

Alternatively, a transmitting WTRU may request a receiving WTRU to disable completely its antenna mapping. This request may be transmitted to the receiving WTRU in a PPDU. Upon receiving the PPDU with the request, the receiving WTRU may or may not comply with the request. Compliance may be indicated by the receiving WTRU in a sounding PPDU. Where the receiving WTRU complies with the request, the currently selected antenna mapping at the receiving WTRU becomes static and may not change.

Figure 5:
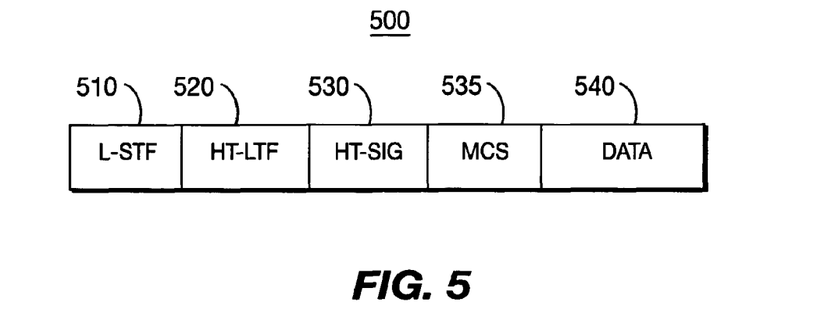
FIG. 5 is a diagram of calibration training frame (CTF) PPDU frame format for implementing antenna mapping selection in accordance with the invention.

Referring to FIG. 5, a diagram of PPDU frame format of a calibration training frame (CTF) PPDU 500 in accordance with an embodiment of the invention is shown. It should be noted that while the frame format shown in FIG. 5 complies with the IEEE 802.11n standards, the present invention may be applied to any IEEE standards. A CTF is used to request the transmission of a sounding packet from the receiving WTRU for channel calibration. The CTF PPDU 500 has a legacy short-training field (L-STF) 510 followed by a high-throughput long training field (HT-LTF) 520, a high-throughput SIGNAL field (HT-SIG) 530, and a Data field 540. The L-STF 510 has the same format as the legacy (pre-802.11n) short training fields. The HT-LTF 520 is a field defined in 802.11n PHY and is used with MIMO transmission training. The HT-SIG 530 is a field defined in 802.11n and indicates the selected modulation and coding scheme and the size of the MAC service data unit (MSDU).

The MCS field 535 includes information related to calibration and antenna mapping selection, such as: 1) indication of the selected antenna mapping used in the transmission of the PPDU; 2) indication of a request for full candidate set sounding in series or in parallel; 3) indication of a request to change the size of the candidate set; 4) a run-length bit to request an update of the receiving WTRU's antenna mapping candidate set; and 5) an indication of a request for a receiving WTRU to temporarily hold antenna mapping selection.

Figure 6:
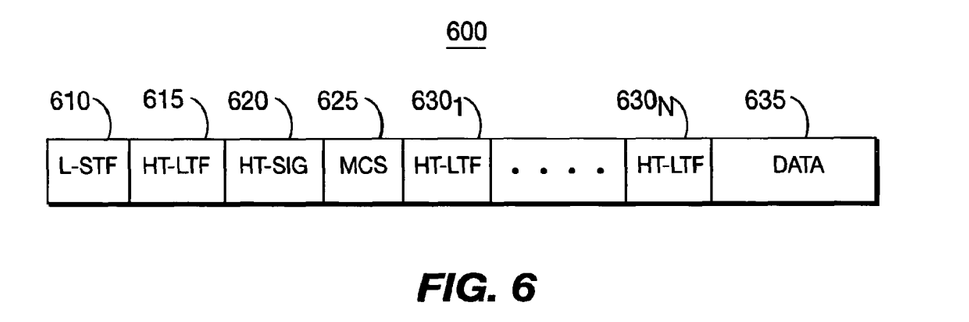
FIG. 6 is a diagram of a sounding PPDU frame format for implementing antenna mapping selection in accordance with the invention.

Referring to FIG. 6, a diagram of a sounding PPDU 600 frame format is shown. Again, it should be noted that while the frame format shown complies with the IEEE 802.11n standards, the present invention may be applied to any IEEE standards. The sounding PPDU includes a legacy short-training field (L-STF) 610, a high-throughput long training field (HT-LTF) 615, a high-throughput SIGNAL field (HT-SIG) 620, a Modulation and Control Sequence (MCS) field 625, followed by a plurality of additional HT-LTFs 6301 through 630N, and a Data field 635. The HT-SIG 620 includes two bits that indicate the size of the candidate set and five bits that indicate the total number N of high-throughput long-training fields (HT-LTFs) 630 included in the PPDU. Accordingly, one HT-LTF for each antenna mapping of a candidate set may be included in the PPDU. Preferably, as disclosed above, the candidate size may be as small as 1 and as large as 32. Each of the HT-LTFs (615 and 630) in the PPDU is transmitted using a different antenna mapping selected from the candidate set. The selected antenna mapping used in transmitting the first HT-LTF 615 as well as the Data field 635 is indicated in the MCS field 625. The MCS field may also include additional bits to indicate: 1) a HOLD/RELEASE request of continued antenna mapping selection at the receiving station; 2) a HOLD/RELEASE confirmation of antenna mapping change in response to a previously received HOLD/RELEASE request; 3) a confirmation of a request previously received in a Calibration Training Frame (CTF) for full candidate set search; and 4) a confirmation of a request previously received in a CTF for a change in the size of the candidate set.

Figure 7:
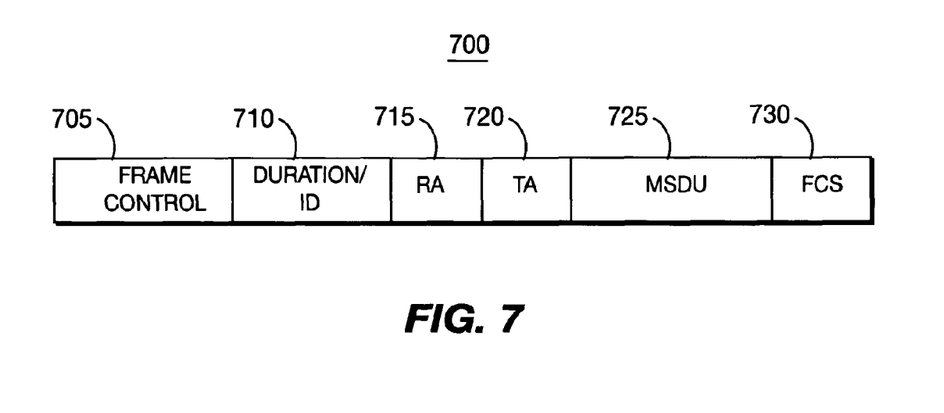
FIG. 7 is a diagram of a sounding PPDU MAC frame format for implementing antenna mapping selection in accordance with the invention.

Referring to FIG. 7, the MAC frame format 700 of the sounding PPDU data frame of FIG. 6 is shown. The MAC fields include a Frame Control field 705, a Duration/ID field 710, a receiver address (RA) field 715, a transmitter address (TA) field 720, a MAC service data unit (MSDU) field 725, and a Frame Check Sequence (FCS) field 730. In one embodiment of the invention, the MSDU 725 may include bits that indicate HOLD/RELEASE confirmation of antenna mapping change in response to a received HOLD/RELEASE request, as discussed above with reference to FIG. 5 and the MCS field 535. By reducing candidate set updating, calibration and associated signaling may be reduced thereby increasing throughput.

Although the features and elements of the present invention are described in the preferred embodiments in particular combinations, each feature or element can be used alone without the other features and elements of the preferred embodiments or in various combinations with or without other features and elements of the present invention.

What is claimed is:

1. A method for use in a wireless transmit/receive unit (WTRU), the method comprising:
    selecting an antenna mapping from a plurality of currently available antenna mappings, wherein the selected antenna mapping comprises one or more of a radio frequency chain, an antenna selected from a plurality of antennas including at least one beamforming antenna, or an antenna beam selected from a plurality of antenna beams associated with the antenna;
    estimating a channel associated with the selected antenna mapping based on a received physical layer packet data unit (PPDU);
    generating a steering matrix associated with the antenna beam of the selected antenna mapping based on the estimated channel; and
    transmitting a data packet to a second WTRU using the selected antenna mapping and the steering matrix.

2. The method of claim 1 comprising:
    transmitting an indication to commence calibration; and
    receiving the sounding PPDU based on the transmitted indication to commence calibration.

3. The method of claim 1, wherein the WTRU is an IEEE 802.11 WTRU.

4. The method of claim 1, wherein the WTRU is an IEEE 802.11 access point.

5. A wireless transmit/receive unit (WTRU) comprising:
    a processor configured to:
        select an antenna mapping from a plurality of currently available antenna mappings, wherein the selected antenna mapping comprises one or more of a radio frequency chain, an antenna selected from a plurality of antennas including at least one beamforming antenna, or an antenna beam selected from a plurality of antenna beams associated with the antenna;
        estimate a channel associated with the selected antenna mapping based on a received sounding physical layer packet data unit (PPDU);
        generate a steering matrix associated with the antenna beam of the selected antenna mapping based on the estimated channel; and
    a transmitter configured to transmit a data packet to a second WTRU using the selected antenna mapping and the steering matrix.

6. The WTRU of claim 5, wherein the transmitter is configured to transmit an indication to commence calibration, and
a receiver is configured to receive the sounding PPDU based on the transmitted indication to commence calibration.

7. The WTRU of claim 5, wherein the WTRU is an IEEE 802.11 WTRU.

8. The WTRU of claim 5, wherein the WTRU is an IEEE 802.11 access point.

* * * * *